United States Patent Office 3,536,854
Patented Oct. 27, 1970

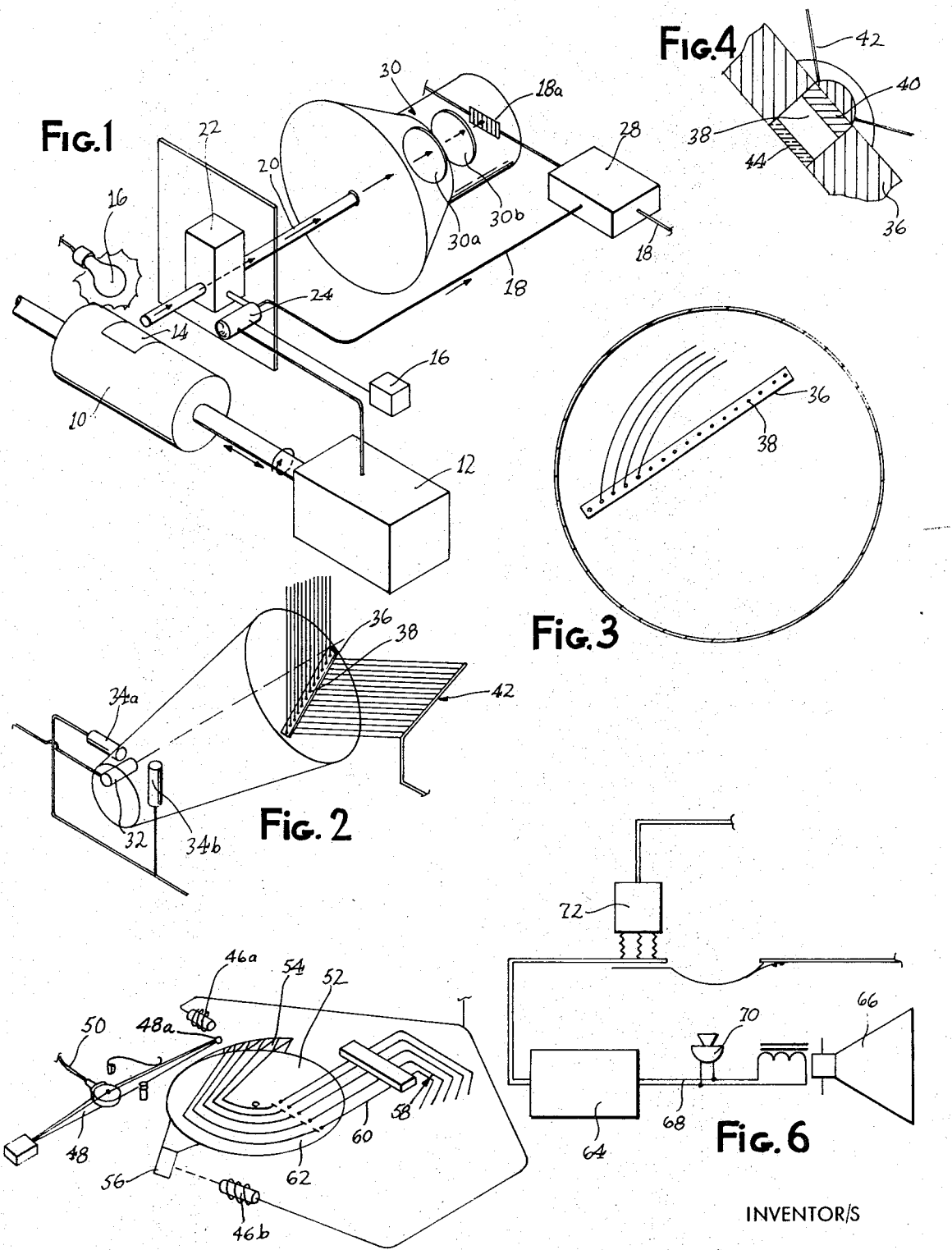

3,536,854
APPARATUS FOR AUDIBLY REPRODUCING PRINTED INDICIA
Luther E. Boldery, Milton, Ky., assignor, by direct and mesne assignments, to Triangle Research, Inc., Madison, Ind., a corporation of Indiana
Filed July 16, 1968, Ser. No. 745,161
Int. Cl. G11b 31/00
U.S. Cl. 179—100.1
20 Claims

ABSTRACT OF THE DISCLOSURE

An apparatus for audibly reproducing from a given surface printed indicia of contrasting energy-reflective properties into articulate sounds characteristic of a spoken language, comprising means for mounting the indicia for audible reproduction, scanner tube means for emitting signals which are characteristic of light waves reflected by said indicia, means for receiving the signals from said scanner tube means and for monitoring the signals into predetermined characteristics, and sound track means associated with the receiving means for producing a facsimile of the human voice according to the monitored signals.

BACKGROUND OF THE INVENTION

Field of the invention

This invention relates to systems for converting one form of manifestation of intelligence to another form, and more particularly to a new and improved apparatus for audibly reproducing printed indicia.

Description of the prior art

Where electrical signals corresponding to alphabetic or numeric characters are derived from written or printed indicia, the problems involved in automatically identifying a particular indicium or manifestation and converting the intelligence represented thereby to audible or spoken form are numerous. For example, with printed or typewritten characters, there are sometimes major variations between typewriter styles, and there are even variations between the characters typed by the same typewriter at different times. Whether these variations constitute changes in the blackness or density of the characters, differences in height or shape, or differences in the background against which the character is provided, may create difficulties for an apparatus to recognize the indicium or manifestation involved and to convert the intelligence represented thereby to audible or spoken form. Additionally, there are numerous problems in connection with efficiently and precisely converting the signal corresponding to the intelligence represented by a particular indicium or manifestation to an audible or spoken form which produces a facsimile of the human voice corresponding to that indicium.

The prior art devices have been unable to satisfactorily alleviate the aforementioned difficulties.

SUMMARY OF THE INVENTION

The present invention provides an apparatus for efficiently and precisely audibly reproducing printed indicia or manifestations of contrasting energy-reflective properties by converting the alphabetic or numeric intelligence represented thereby to electrical signals which may be recognized and monitored into predetermined characteristics. The predetermined characteristics subsequently actuate a plurality of sound track means so as to produce a facsimile of the human voice according to the monitored signals and corresponding to the printed indicia or manifestations.

Broadly speaking, the apparatus of the present invention comprises means for mounting a given surface having thereon the indicia or manifestations for audible reproduction, scanner tube means for emitting signals which are characteristic of light waves reflected by the indicia or manifestations, means for receiving the signals from the scanner tube means and for monitoring the signals into predetermined characteristics, and sound track means associated with the receiving means for producing a facsimile of the human voice according to the monitored signals.

The means for mounting a given surface having thereon the indicia for audible reproduction preferably comprises a rotatable drum and means for rotating the drum.

The scanner tube means comprises a light source directed on the printed indicia mounted on the drum, circuit means connecting the scanner tube means to a source of electricity, including photosensitive means for controlling the amount of current passing through the scanner tube means and thus the signal emitted therefrom, and means for directing light waves reflected from the printed indicia to the photosensitive means.

The scanner tube means also includes a shutter for controlling the admission of reflected light from the directing means, a print sensor associated with the shutter and the means for rotating the drum, means associated with the print sensor for sequentially indexing the scanner tube means back and forth in a substantially horizontal plane, and switch means associated with the print sensor and the circuit means for admitting current to the scanner tube means the instant the shutter is opened.

The means for receiving the signals from the scanner tube means and for monitoring the signals into predetermined characteristics may be either electrical, called a selector tube, or mechanical. The selector tube comprises an electron gun, at least two electromagnets associated with the electron gun which are responsive to the signals from the scanner tube means so as to control the direction and attitude of the electron beam, an elongated member spaced from the electron gun and having a series of apertures therein corresponding in number and position to the predetermined characteristics, the apertures being provided with photosensitive means therein, and circuit means connected to a source of electricity and connecting each one of the photosensitive means to the sound track means. Accordingly, when a signal from the scanner tube means actuates the electromagnets, the electron gun discharges an electron beam whose direction and attitude are controlled by the electromagnets such that the predetermined characteristic photosensitive means corresponding to that signal will allow a signal to be transmitted to that portion of the sound track means corresponding to that predetermined characteristic.

The mechanical means for receiving the signals from the scanner tube means and for monitoring the signals into predetermined characteristics includes at least two electromagnets responsive to the signals from the scanner tube means, an arm which may be pivoted by one of said electromagnets, the arm being connected by circuit means to a cource of electricity, a rotatably mounted wheel having a series of peripheral contact points thereon corresponding in number and position to the predetermined characteristics, the wheel having a lug thereon which may be actuated by one of the electromagnets so that the wheel may be rotated, and circuit means connecting each of the contact points to the sound track means. Accordingly, when a signal from the scanner tube actuates the electromagnet, the arm is drawn toward one electromagnet and the lug on the wheel is drawn toward the other electromagnet, causing the wheel to rotate slightly. The movement of the arm and the rotation of the wheel are synchronized such that when a signal from the scanner tube means indicates a predetermined characteristic, the contact point of the wheel corresponding to that predetermined characteristic is contiguous with the arm, thereby closing the circuit means connecting that contact point to that portion of the sound track means corresponding to that predetermined characteristic.

Finally, the sound track means comprises a plurality of sound tracks whose number corresponds to the number of the predetermined characteristics monitored by the receiving means, each sound track having prerecorded thereon a facsimile of the human voice representative of each indicium, speaker means associated with the sound tracks for emitting the prerecorded sounds from the sound tracks, and circuit means connected to a source of electricity and associated with each sound track such that the sound tracks are connected to the speaker means. When the predetermined characteristics from the receiving means actuate their corresponding circuit means so that the prerecorded indicium from the sound tracks will be emitted from the speaker means, a facsimile of the human voice representative of the printed indicia is produced.

BRIEF DESCRIPTION OF THE DRAWING

FIG. 1 is a perspective view of preferred means for mounting a given surface having thereon printed indicia or manifestations of contrasting energy-reflective properties for audible reproduction and of a preferred scanner tube means.

FIG. 2 is a perspective view of electrical means for receiving signals from the scanner tube means.

FIG. 3 is an enlarged perspective view of the perforated bar of the electrical means of FIG. 2.

FIG. 4 is an enlarged detail view of one of the perforations of the bar of FIGS. 2 and 3.

FIG. 5 is a perspective view of mechanical means for receiving signals from the scanner tube means.

FIG. 6 is a schematic representation of one exemplary sound track, speaker means and associated circuit means according to the apparatus of this invention.

DESCRIPTION OF THE PREFERRED EMBODIMENTS

The apparatus of the present invention for audibly reproducing from a given surface printed indicia or manifestations of contrasting energy-reflective properties generally comprises four sub-systems. The first sub-system includes means for mounting a given surface having thereon the printed indicia or manifestations of contrasting energy-reflective properties for audible reproduction. The second sub-system includes scanner tube means for emitting signals characteristic of light waves reflected by the printed indicia or manifestations. The signals from the scanner tube means are received and monitored by a third sub-system into predetermined characteristics, and a fourth sub-system comprising sound track means is associated with the receiving means for reproducing a facsimile of the human voice according to the monitored signals.

A preferred embodiment of the means for mounting a given surface having thereon the printed indicia or manifestations for audible reproduction is disclosed in FIG. 1. There a rotatable drum 10 is operated by the motor 12. A sheet 14 containing the printed indicia or manifestations is mounted directly on the surface of the drum 10.

Broadly speaking, the scanner tube means of the second sub-system comprises a light source 16 directed on the printed indicia or manifestations of the sheet 14 mounted on the drum 10, circuit means 18 connecting the scanner tube to a source of electricity, including photosensitive means 18a for controlling the amount of current passing through the scanner tube and thus the signal emitted therefrom, and means 20 for directing light waves reflected from the printed indicia or manifestations on the sheet 14 to the photosensitive means 18a. The photosensitive means 18a is preferably a selenium strip and the means 20 for directing light waves reflecting from the printed indicia or manifestations on the sheet 14 to the photosensitive means 18a is preferably an elongated light tube. However, the scanner tube means may be mounted in an enclosure which is secure from all outside sources of light and which would serve the same purpose as the elongated light tube 20. The scanner tube means of the second sub-system may also preferably include a shutter 22 for controlling the admission of reflected light to the light tube 20. A print sensor 24 is associated with the shutter 22 and the motor 12 for rotating the drum 10. A unit 26 is connected by appropriate circuit means with the print sensor 24 for sequentially indexing the scanner tube back and forth in substantially a horizontal plane in front of the drum 10. Switch means 28 associated with the print sensor 24 and the scanner tube circuit means 18 insures that current is admitted to the scanner tube the instant the shutter 22 is opened.

The scanner tube of the second sub-system may also include a lens system 30 which preferably comprises a diffusion lens 30a which breaks up the image it has received and scatters the light to a spot lens 30b which concentrates the light upon the photosensitive means 18a. As was previously explained, the photosensitive means 18a is preferably selenium whose electrical conducting ability is effected by the amount of light that is placed upon it, thereby altering the impulse of electrical energy or signal leaving the scanner tube sub-system according to the amount of light reflected by the printed indicia or manifestations on the sheet 14 mounted on the drum 10.

The third sub-system of the present invention comprises means for receiving the signals emitted from the scanner tube and means for monitoring the signals into predetermined characteristics. The third sub-system may comprise either of two units. The first unit is disclosed in FIGS. 2, 3 and 4 and is primarily electrical in nature. This unit generally comprises an electron gun 32, at least two electromagnets, such as the electromagnets 34a and 34b, associated with the electron gun 32 and responsive to the signals emitted from the scanner tube so as to control the direction and attitude of the electron beam emitted from the electron gun 32, an elongated member 36 spaced from the electron gun 32 and having a series of apertures 38 therein corresponding in number and position to the predetermined characteristics, the apertures being provided with photosensitive means 40 therein, and circuit means 42 connected to a source of electricity and connecting each one of the photosensitive means 40 with the sound track means of the fourth sub-system of the present invention.

The elongated member 36 is preferably a curved bar which is disposed at an angle of substantially 45° from the horizontal. Each aperture 38 in the curved bar 36 contains a lens 44 which is treated so as to glow when struck by an electron beam from the electron gun 32. The photosensitive means 40 is preferably a selenium plug and is mounted behind the lens 44.

In operation, when a signal from the scanner tube actuates the electromagnets 34a, 34b, the electron gun 32 discharges an electron beam whose direction and attitude are controlled by the electromagnets such that the predetermined characteristic photosensitive means 40 corresponding to that signal will allow a signal to be transmitted to that portion of the sound track means of the fourth sub-system corresponding to that predetermined characteristic. More specifically, the electron beam is pulled vertically by one electromagnet and horizontally by another electromagnet. The arc of the electron beam, as best seen in FIG. 3, is controlled by the signal coming from the scanner tube, the stronger the signal the wider the arc, and the beam is directed into the aperture 38 in the surved bar 36 having the predetermined characteristic photosensitive means 40 corresponding to that signal.

This, of course, allows a signal to be transmitted to that portion of the sound track means of the fourth sub-system corresponding to that predetermined characteristic.

It will, of course, be obvious that the curved bar 36 may contain any number of apertures 38 having photosensitive means 40. The number of apertures 38 and their positioning will depend upon the number of predetermined characteristics which are desired. For example, if the apparatus of the present invention is utilized in connection with the English language, the number of predetermined characteristics will correspond to the number of letters in the alphabet and the basic numerals from 0 to 9.

The means for receiving the signals emitted from the scanner tube and for monitoring the signals into predetermined characteristics may also comprise a sub-system as disclosed in FIG. 5. This sub-system includes at least two electromagnets 46a and 46b which are responsive to the signals emitted from the scanner tube. A pivotal arm 48, having an electrical contact 48a, is connected by circuit means 50 to a source of electricity and may be pivoted when the electromagnet 46a is actuated by a signal emitted from the scanner tube. A wheel 52 is rotatably mounted adjacent the pivotal arm 48. The wheel 52 is provided with a series of peripheral contact points 54 corresponding in number and position to the desired predetermined characteristics. A lug 56, which may be actuated by the electromagnet 46b so that the wheel 52 may be rotated, is also positioned on the wheel 52. Circuit means 58 connect each of the peripheral contact points 54 with the sound track means of the fourth sub-system.

In operation, when a signal from the scanner tube activates the electromagnets 46a and 46b, the arm 48 is drawn toward the electromagnet 46a and the lug 56 on the wheel 52 is drawn toward the electromagnet 46b, causing the wheel 52 to rotate slightly. The movement of the arm 48 and the rotation of the wheel 52 are synchronized such that when a signal from the scanner tube indicates a predetermined characteristic, the contact point 54 on the wheel 52 corresponding to that predetermined characteristic is contiguous with the electrical contact 48a on the arm 48. This closes the circuit means 58 connecting that contact point 54 to that portion of the sound track means of the fourth sub-system corresponding to that predetermined characteristic.

As can be seen from FIG. 5, the circuit means 58 connecting each contact point 54 with the sound track means of the fourth sub-system may include a steel fork 60 which slides on contact strips 62. The material of which the wheel is composed will obviously be non-conductive to electricity.

It can also be seen from FIG. 5 that each successive contact point 54 extends outwardly a greater distance from the periphery of the wheel 52. This is done so as to prevent all of the peripheral points from being activated at the same time. A suitable conductive material, such as the contact strips 62, is placed upon the wheel 52 to the contact points 54, so that when a partial revolution of the wheel is effected by the electromagnet 46b, the steel forks 60 placed above the wheel come in contact with the contact points on the wheel, thereby effecting an electrical connection between the contact points, the needle or arm 48 and the sound track means of the fourth sub-system. The sound track means of the fourth sub-system is then instantly activated by the electrical impulse or signal to produce the sound representative of that particular predetermined characteristic. The sound track means are activated one after the other in this manner and produce a facsimile of the human voice according to the impulses which they receive.

The fourth sub-system of the present apparatus comprises sound track means associated with the receiving means for producing a facsimile of the human voice according to the monitored signals from the third sub-system. The sound track means of the fourth sub-system is generally shown in FIG. 6 and comprises a plurality of sound tracks 64 whose number corresponds to the number of desired predetermined characteristics monitored by the receiving means of the third sub-system. Each sound track 64 has pre-recorded thereon a facsimile of the human voice representative of a particular indicium or manifestation, such as a particular letter of the alphabet. Speaker means 66 are associated with the sound tracks 64 for emitting the pre-recorded sounds therefrom. Circuit means 68, connected to a source of electricity, is associated with each sound track 64 such that all of the sound tracks 64 are connected to the speaker means 66. Amplification means, such as the microphone 70, may be utilized to amplify each pre-recorded indicium on the sound tracks 66. Each circuit means 68 preferably includes an electromagnet 72 whose actuation by one of the monitored predetermined characteristics from the receiving means of the third sub-system closes that particular circuit means 68.

In operation, when predetermined characteristics from the receiving means actuate their corresponding circuit means 68 in the sound track means, the pre-recorded indicium from the sound tracks 64 will be emitted from the speaker means 66 and produce a facsimile of the human voice representative of the printed indicia or manifestations on the sheet 14 of the drum 10. When the sound tracks are activated one after the other a facsimile of the human voice is produced according to the impulses received.

While the operation of individual sub-systems of the present invention has heretofore been explained, the interrelation of these systems and the operation of the entire apparatus will now be explained. The sheet 14 containing the printed indicia or manifestations which are to be audibly reproduced is placed upon the drum 10. The print sensor 24 of the scanner tube means of the second sub-system is connected to the motor 12 and the sequential indexing means 26. The light source 16 directs light onto the sheet 14 containing the printed indicia and light rays are reflected from the indicia and sensed by the print sensor 24. The shutter 22 and the switch means 28 are then simultaneously actuated. Light rays corresponding to the printed indicia from which they are reflected are directed through a light tube 20 and strike a diffusing lens 30a and a spot lens 30b of a lens system 30, causing them to be precisely directed against the photosensitive means 18a. The current passing through the scanner tube of the second sub-system will, of course, send out varying impulses or signals depending upon the amount of light which strikes the photosensitive means 18a. The impulses or signals from the scanner tube means of the second sub-system are then received and monitored into predetermined characteristics by either the sub-system disclosed in FIGS. 2 through 4, or the sub-system disclosed in FIG. 5. If the third sub-system comprises the device of FIGS. 2 through 4, the impulses or signals actuate an electron gun 32 and at least two electromagnets 34a and 34b, which control the direction and attitude of the electron beam such that the electron beam strikes the predetermined characteristic photosensitive means 40 corresponding to that signal from the second sub-system which will allow a further signal or impulse to be transmitted to that portion of the sound track means of the fourth sub-system corresponding to that predetermined characteristic for the printed indicium.

If the third sub-system comprises the device of FIG. 5, the signal or impulse from the scanner tube of the second sub-system activates the electromagnets 46a and 46b so that the pivotal arm 48 is drawn toward one electromagnet 46a and the lug on the wheel 52 is drawn toward the other electromagnet 46b, causing the wheel 52 to rotate slightly. The movement of the arm 48 and the rotation of the wheel 52 are synchronized such that when a signal from the scanner tube of the second sub-system indicates a predetermined characteristic for the printed indicium, the contact point 54 on the wheel 52 corresponding to that predetermined characteristic is contiguous with the arm 48, thereby closing the circuit means 58 connecting that contact point 54 to that portion of the sound track means of the fourth sub-system which corresponds to that predetermined characteristic for the printed indicium.

The impulses or signals from the third sub-system actuate a plurality of sound tracks 64 in the fourth sub-system. The plurality of sound tracks 64 corresponds in number to the predetermined characteristics of the printed indicia monitored by the receiving means of the third sub-system, and each sound track 64 has prerecorded thereon a facsimile of the human voice representative of each indicium. When the sound tracks 64 are actuated by the predetermined characteristics from the receiving means on the third sub-system, they actuate their corresponding circuit means 68 so that the prerecorded indicium thereon will be emitted from the speaker means 66 and produce a facsimile of the human voice representative of the printed indicia on the sheet 14 on the drum 10.

While certain preferred embodiments of the invention have been specifically illustrated and described, it is understood that the invention is not limited thereto, as many variations will be apparent to those skilled in the art, and the invention is to be given its broadest interpretation within the terms of the following claims.

The embodiments of the invention to which an exclusive property or privilege is claimed are defined as follows:

1. An apparatus for audibly reproducing from a given surface printed indicia of contrasting energy-reflective properties into articulate sounds characteristic of a spoken language, which comprises:
    (a) means for mounting a given surface having thereon printed indicia of contrasting energy-reflective properties for audible reproduction;
    (b) scanner tube means for emitting signals which are characteristic of light waves reflected by said indicia;
    (c) means for receiving said signals from said scanner tube means and for monitoring said signals into predetermined characteristics, said signal receiving and monitoring means comprising a selector tube including:
        (i) an electron gun;
        (ii) at least two electromagnets associated with said electron gun, said electromagnets being responsive to the signals from said scanner tube means so as to control the direction and attitude of said electron beam;
        (iii) an elongated member spaced from said electron gun and having a series of apertures therein corresponding in number and position to said predetermined characteristics, said apertures being provided with photosensitive means therein; and
        (iv) circuit means connected to a source of electricity and to each one of said photosensitive means; and
    (d) sound track means connected by said circuit means to each one of said photosensitive means for producing articulate sounds characteristic of a spoken language according to the monitored signals;
whereby when a signal from said scanner tube means actuates said electromagnets, said electron gun discharges an electron beam whose direction and attitude are controlled by said electromagnets such that the predetermined characteristic photosensitive means corresponding to that signal will allow a signal to be transmitted to that portion of said sound track means corresponding to that predetermined characteristic.

2. The apparatus according to claim 1, wherein said elongated member is a curved bar which is disposed at at angle of substantially 45° from the horizontal.

3. The apparatus according to claim 1, wherein said means for mounting said indicia for audible reproduction comprises a rotatable drum and means for rotating said drum, said printed indicia being mounted on the surface of said drum.

4. The apparatus according to claim 3, wherein said scanner tube means comprises:
    (a) a light source directed on said printed indicia mounted on said drum;
    (b) circuit means connecting said scanner tube means to a source of electricity, including photosensitive means for controlling the amount of current passing through said scanner tube means and thus the signal emitted therefrom; and
    (c) means for directing light waves reflected from said printed indicia to said photosenstive means.

5. The apparatus according to claim 4, wherein said photosensitive means comprises a selenium strip.

6. The apparatus according to claim 4, wherein said means for directing light waves reflected from said printed indicia to said photosensitive means comprises an elongated tube.

7. The apparatus according to claim 4, wherein said scanner tube means includes:
    (a) a shutter for controlling the admission of reflected light to said directing means;
    (b) a print sensor associated with said shutter and said means for rotating said drum;
    (c) means associated with said print sensor for sequentially indexing said scanner tube means back and forth in a substantially horizontal plane; and
    (d) switch means associated with said print sensor and said circuit means for admitting current to said scanner tube means the instant said shutter is opened.

8. The apparatus according to claim 7, wherein a lens system is located in said scanner tube between said directing means and said photosensitive means so that said reflected light waves are precisely focused on said photosensitive means.

9. The apparatus according to claim 1, wherein a lens treated to glow when struck by an electron beam is mounted in each aperture in said elongated member, and wherein said photosensitive means is mounted in each aperture behind said lens.

10. The apparatus according to claim 9, wherein said photosensitive means in each aperture of said bar comprises a selenium plug.

11. The apparatus according to claim 10, wherein the number of apertures in said bar correspond to the number of letters in the alphabet and to the numerals 0 to 9.

12. The apparatus according to claim 1, wherein said sound track means comprises:
    (a) a plurality of sound tracks whose number corresponds to the number of said predetermined characteristics monitored by said receiving means, each said sound track having pre-recorded thereon a facsimile of the human voice representative of each indicium;
    (b) speaker means associated with said sound tracks for emitting said pre-recorded sounds from said sound tracks; and
    (c) circuit means connected to a source of electricity and associated with each said sound track such that said sound tracks are connected to said speaker means; whereby said predetermined characteristics from said receiving means actuate their corresponding circuit means so that said pre-recorded indicium from said sound tracks will be emitted from said speaker means and produce a facsimile of the human voice representative of said printed indicia.

13. The apparatus according to claim 12, wherein there are twenty-six sound tracks, each said sound track having a pre-recorded sound thereon of a facsimile of the human voice representative of a letter of the alphabet.

14. The apparatus according to claim 12, wherein each said circuit means includes an electromagnet whose actuation by one of said predetermined characteristics from said receiving means closes said circuit means.

15. The apparatus according to claim 12, including amplification means to amplify said pre-recorded indicium on said sound tracks.

16. The apparatus according to claim 15, wherein said amplifying means includes a microphone.

17. An apparatus for audibly reproducing from a given surface printed indicia of contrasting energy-reflective properties into articulate sounds characteristic of a spoken language, which comprises:
   (a) means for mounting a given surface having thereon printed indicia of contrasting energy-reflective properties for audible reproduction;
   (b) scanner tube means for emitting signals which which are characteristic of light waves reflected by said indicia;
   (c) means for receiving said signals from said scanner tube means and for monitoring said signals into predetermined characteristics, said signal receiving and monitoring means comprising:
      (i) at least two electromagnets responsive to the signals from said scanner tube means;
      (ii) an arm which may be pivoted by one of said electromagnets, said arm having an electrical contact thereon connected by circuit means to a source of electricity; and
      (iii) a rotatably mounted wheel having a series of peripheral contact points thereon corresponding in number and position to said predetermined characteristics, said wheel having a lug thereon which may be actuated by one of said electromagnets so that said wheel may be rotated; and
   (d) sound track means connected by circuit means with each of said contact points on said rotatably mounted wheel for producing articulate sounds characteristic of a spoken language according to the monitored signals;

whereby when a signal from said scanner tube means actuates said electromagnets, said arm is drawn toward one electromagnet and said lug on said wheel is drawn toward the other electromagnet, causing said wheel to rotate slightly, the movement of said arm and the rotation of said wheel being synchronized such that when a signal from said scanner tube means indicates a predetermined characteristic, the contact point on said wheel corresponding to that predetermined characteristic is contiguous with the electrical contact on said arm, thereby closing said circuit means connecting that contact point to that portion of said sound track means corresponding to that predetermined characteristic.

18. The apparatus according to claim 17, wherein said circuit means connecting each contact point to said sound track means includes steel forks which slide on contact strips.

19. The apparatus according to claim 18, wherein the number of contact points on the periphery of said wheel correspond to the number of letters in the alphabet and to the numerals 0 to 9.

20. The apparatus according to claim 19, wherein each successive contact point extends outwardly a greater distance from the periphery of said wheel.

References Cited
UNITED STATES PATENTS

| | | | |
|---|---|---|---|
| 3,175,038 | 3/1965 | Mauch | 179—1 |
| 2,857,376 | 11/1958 | Kirkpatrick | 340—173 |
| 2,615,992 | 10/1952 | Flory | 179—100.3 |
| 2,897,481 | 7/1959 | Shepard | 179—1 |
| 2,137,888 | 12/1938 | Fuller | 179—100.3 |
| 3,114,980 | 12/1963 | Davis | 179—1 |

BERNARD KONICK, Primary Examiner

J. ROSENBLATT, Assistant Examiner